G. W. PARRISH.
HORSE-POWER.
No. 179,486.  Patented July 4, 1876.
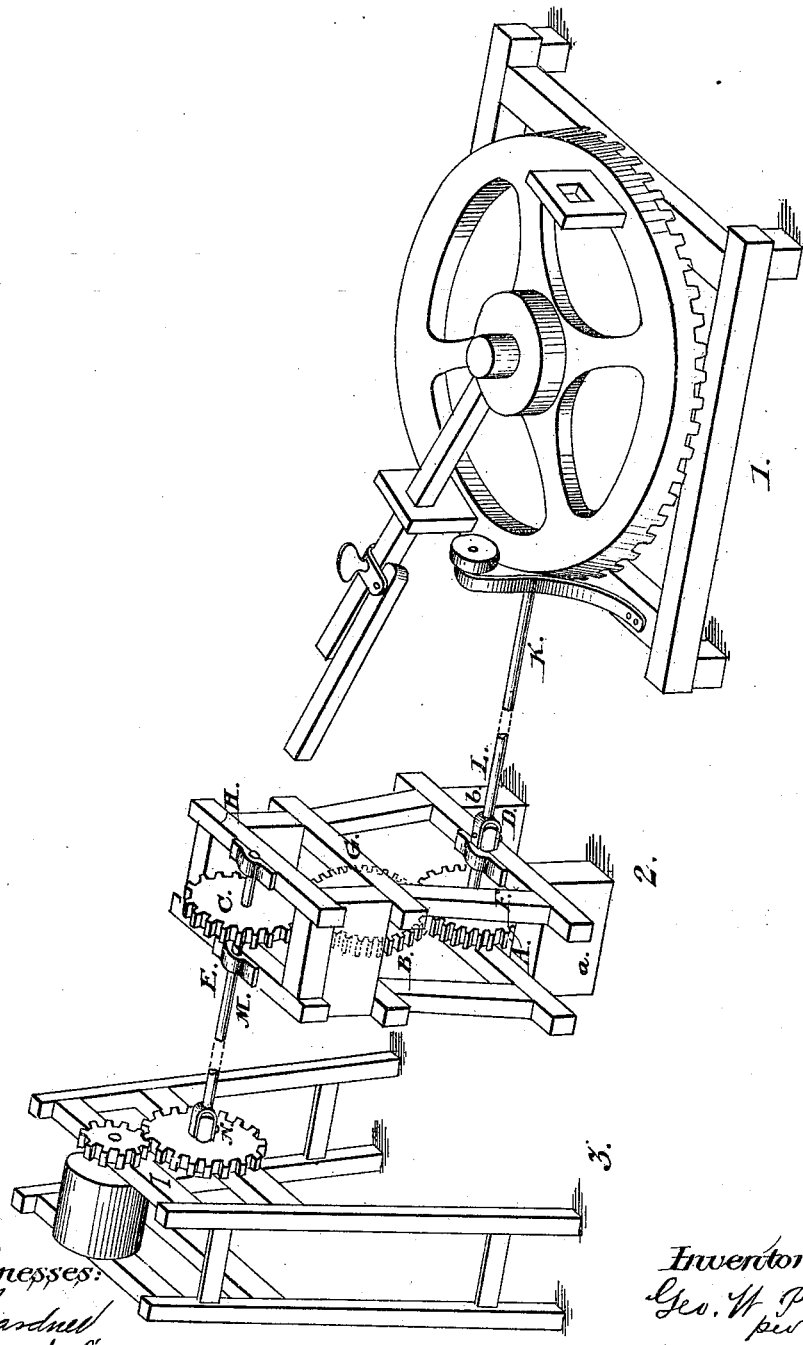

UNITED STATES PATENT OFFICE.

GEORGE W. PARRISH, OF SALEM, ASSIGNOR OF ONE-THIRD OF HIS RIGHT TO ROBERT B. MOORMAN, OF BIG LICK, VIRGINIA.

IMPROVEMENT IN HORSE-POWERS.

Specification forming part of Letters Patent No. 179,486, dated July 4, 1876; application filed March 4, 1876.

*To all whom it may concern:*

Be it known that I, GEO. W. PARRISH, of Salem, in the county of Roanoke and State of Virginia, have invented certain Improvements in Horse-Powers, which are fully set forth in the following specification, reference being had to the accompanying drawings.

My invention consists in combining with the main horse-power frame, two auxiliary frames, geared and connected to the main frame, as shown, the cog-wheels being of such diameter that the third and smaller wheel will make a greater number of revolutions than the lower and larger wheel, thus affording accelerated motion, which can be increased or diminished at will, by simply inserting a wheel of greater or less diameter.

The accompanying drawing illustrates the invention.

The lower wheel, A', represents a wheel of ten inches in diameter; the second wheel, B, represents a wheel of eight and three-tenths inches in diameter; the third wheel, C, a wheel of six and two-thirds inches in diameter. Each of these wheels is driven by journals passing through their center axis, which revolve in boxes, said boxes being fixed in the supporting-frames F G H.

The journals passing through wheels A and C are extended a sufficient length to form square shafts at D and E, which receive the couplings by which my improvement can be attached to the tumbling-shafts used for propelling geared machines, as illustrated by K L M N. F G H I represent the wooden frames upon which the journals rest in their several boxes, and by which the wheels are kept in gear, which are of wood, and of a thickness required by the radii of the wheels to keep them in gear.

The frames are bound together by iron bolts and screws passing through each corner, and made fast to the ground by stubs passing through iron rings at each lower corner of said frame, or to a plank floor by iron spikes passing through each corner of lower frame at *a b*.

1 represents main horse-power; 2, my improvements, as above described; 3, the thrash-box or other machinery to be used.

By the use of three wheels I increase motion without changing its direction, whereby the practical value of my invention is enhanced, because, there being no change in the direction of the motion, it can be applied to all geared machinery now in use.

By reference to drawing and the laws governing the revolution of wheels, it will be perceived that the upper journal, connecting with the thrash-box, or other machinery to be used, makes three revolutions, while the lower journal, connecting with the power (horse or other) to be applied, makes but two revolutions. Therefore, if the power to be applied is in excess of the weight to be moved under a uniform motion, that motion is increased one-third at and from the upper journal.

If increased motive power is desired, one-third more effective force is obtainable, without any diminution of present motion by lengthening the lever, and thereby increasing the leverage power, which the increased motion at and from the upper journal enables me to obtain without any acceleration of speed in the gait of the horse, thus enabling me to increase the weight-moving power of the horse in proportion to the increased leverage-power obtained.

An advantage, and one of general utility resulting from the use of this invention, is that it enables the operator to use machinery (horse-power) to its maximum capacity, which has heretofore been impracticable, because the requisite motion was not obtainable without too rapid speed and exhaustive draft, both of which are lessened by this invention, and thereby the operator enabled to run the machinery more consecutive hours, and consequently to do more work in the time allotted for a day's labor.

I make no claim as to the clamp (jaw or other) by which my invention is attached to any machinery with which it may be used, this being left to the preference of the manufacturer or operator.

I claim as my invention—

The combination of the frames, with their gearing and connections, whereby accelerated motion is produced, and the working capacity is increased, substantially as herein shown and described.

GEO. W. PARRISH.

Witnesses:
JOHN A. FRANCIS,
J. H. PALMER,
W. T. YOUNGER.